(12) United States Patent
Hovestadt et al.

(10) Patent No.: US 6,534,620 B1
(45) Date of Patent: *Mar. 18, 2003

(54) HYDROXY-FUNCTIONAL POLYURETHANE CARBONATES, A PROCESS FOR THEIR PREPARATION AND THEIR USE AS BINDERS

(75) Inventors: Wieland Hovestadt, Krefeld (DE); Martin Melchiors, Aachen (DE); Hans-Joachim Scholl, Köln (DE)

(73) Assignee: Bayer Aktiengesellschaft, Leverkusen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/841,209

(22) Filed: Apr. 29, 1997

(30) Foreign Application Priority Data

May 13, 1996 (DE) ............................. 196 19 237

(51) Int. Cl.$^7$ ................................. C08G 18/44
(52) U.S. Cl. ............................. 528/80; 528/84; 528/85; 252/182.26; 525/437; 525/467
(58) Field of Search ............................. 528/80, 84, 85; 252/182.26; 525/467, 437

(56) References Cited

U.S. PATENT DOCUMENTS

| 3,357,932 A | 12/1967 | Heydkamp et al. | 260/2.5 |
| 3,640,967 A | 2/1972 | König et al. | 260/77.5 |
| 3,867,350 A | 2/1975 | Pedain et al. | 260/77.5 AM |
| RE29,224 E | 5/1977 | Pedain et al. | 260/77.5 AM |
| 4,214,073 A | 7/1980 | Passagne et al. | 528/369 |
| 4,533,729 A | 8/1985 | Newland et al. | 528/371 |
| 4,808,691 A | 2/1989 | König et al. | 528/76 |
| 5,116,929 A | 5/1992 | Greco et al. | 528/44 |

FOREIGN PATENT DOCUMENTS

CA 2123149 11/1994

Primary Examiner—Rachel Gorr
(74) Attorney, Agent, or Firm—Joseph C. Gil; Thomas W. Roy; Diderico van Eyl

(57) ABSTRACT

The present invention relates to a process for preparing hydroxy-functional polyurethane carbonates by reacting a) a dihydroxy- or higher hydroxy-functional polymer having a number average molecular weight of 500 to 100,000 and containing aliphatic carbonate groups and optionally ester groups with b) compounds containing at least one primary or secondary amino group and at least one hydroxy group to form urethane groups, wherein components a) and b) are present in amounts which correspond to a molar ratio of carbonate and ester groups of component a) to primary and secondary amino groups of component b) of greater than 1:1 to 20:1. The present invention also relates to the hydroxy-functional polyurethane carbonates obtained by this process and to their use as a binder component in polyurethane compositions, especially coating compositions.

10 Claims, No Drawings

HYDROXY-FUNCTIONAL POLYURETHANE CARBONATES, A PROCESS FOR THEIR PREPARATION AND THEIR USE AS BINDERS

BACKGROUND OF THE INVENTION

1. Field of the Invention

The present invention relates to a process for producing hydroxy-functional polyurethane carbonates, to the resulting hydroxy-functional polyurethane carbonates and to their use as a binder component for polyurethane compositions, especially coating compositions.

2. Description of the Prior Art

Homopolymeric or copolymeric, hydroxy-functional, aliphatic polycarbonates are known. They are used in the field of high-quality polyurethane plastics and polyurethane coatings because of their high resistance to hydrolysis. They are generally produced from diols which are not vicinal diols, by reaction with a diaryl carbonate (DE-A 1,915,908) or a dialkyl carbonate (DE-A 2,555,805). Of the diols described in the literature, only those which are exclusively or predominantly based on 1,6-hexanediol have previously achieved major commercial importance.

Homopolymeric polycarbonates based on $C_4$–$C_{12}$ diols are crystalline solids having a melting point between 30 and 60° C., depending upon their molecular weight (H. Schnell in "Chemistry and Physics of Polycarbonates", J. Wiley and Sons, 1964, page 15). Copolymeric polycarbonates, such as those described in U.S. Pat. No. 4,553,729, for example, are in fact liquid at room temperature, but their viscosity is so high that they can only be used with difficulty for the production of polyurethane plastics and polyurethane coatings.

Polyester polycarbonates based on caprolactone (DE-A 1,770,245) or low molecular weight adipic acid polyesters (EP-A 364,052) exhibit a reduced tendency towards crystallization and a lower viscosity, but the resistance to hydrolysis of polyurethane plastics and polyurethane coatings based on these diols is reduced.

Polyether polycarbonates, such as those described in DE-A 2,221,751 or in EP-A 292,772 are more hydrophilic, and have an inferior resistance to weathering due to their ether groups.

EP-A 624,614 teaches the production of polyurethane polycarbonates by the reaction of polycarbonates with diamines. The products obtained contain free terminal amino groups and are wax-like at room temperature when pure polycarbonates are used. Despite this disadvantage, these products are valuable starting materials for the production of polyurethanes. However, these products are unsuitable as binders or binder components in coating compositions.

An object of the present invention is to develop polymers containing hydroxy-functional carbonate groups which do not exhibit the said disadvantages of the prior art.

It has now surprisingly been found that low-viscosity, hydroxy-functional polyurethane polycarbonates which are stable towards crystallization are produced when polymers containing aliphatic carbonate groups are reacted with certain amino alcohols.

SUMMARY OF THE INVENTION

The present invention relates to a process for preparing hydroxy-functional polyurethane carbonates by reacting a) a dihydroxy- or higher hydroxy-functional polymer having a number average molecular weight of 500 to 100,000 and containing aliphatic carbonate groups and optionally ester groups with b) compounds containing at least one primary or secondary amino group and at least one hydroxy group to form urethane groups, wherein components a) and b) are present in amounts which correspond to a molar ratio of carbonate and ester groups of component a) to primary and secondary amino groups of component b) of greater than 1:1 to 20:1.

The present invention also relates to the hydroxy-functional polyurethane carbonates obtained by this process and to their use as a binder component in polyurethane compositions, especially coating compositions.

DETAILED DESCRIPTION OF THE INVENTION

The hydroxy-functional, aliphatic polymers containing carbonate groups which are suitable for use as component a) are known in the art. All dihydroxy- or higher hydroxy-functional aliphatic homopolymeric or copolymeric polycarbonates can be used. Polycarbonates which contain other groups in addition to carbonate groups, such as polyester polycarbonates or polyether polycarbonates, may also be used. Dihydroxy, aliphatic, homopolymeric or copolymeric polycarbonates are preferably used.

The number average molecular weight ($M_n$, which may be calculated from the hydroxyl group content and hydroxyl functionality) of the polymers which contain carbonate groups and which can be used as component a) is 500 to 100,000, preferably 500 to 10,000 and more preferably 1000 to 5000.

Component b) is selected from organic compounds which contain at least one primary or secondary amino group and at least one hydroxyl group per molecule. Examples include ethanolamine, 1-amino-2-propanol, 2-amino-1-propanol, 3-amino-1-propanol, 2-amino-1-butanol, 4-amino-1-butanol, 2-amino-2-methyl-1-propanol, 2-tert.-butylaminoethanol, 2-amino-3-methyl-butanol, methylamino-ethanol, 2-(ethylamino)-ethanol, 2-(2-aminoethoxy)-ethanol, 2-(2-aminoethylamino)-ethanol, 2-((3-amino-propyl)-methylamino)-ethanol, diethanolamine, 2-amino-2-methyl-1,3-propanediol, 3-(aminomethyl)-1,2-propanediol, 3-amino-1,2-propanediol, 1,1'-iminodi-2-propanol, 2-amino-2-hydroxymethyl-1,3-propanediol, 3-piperidinol, 4-piperidinol, 2,2,6,6-tetramethyl-4-piperidinol, 2-aminobenzyl alcohol, 3-aminobenzyl alcohol, 2-(benzylamino)-ethanol, 2-anilino-ethanol, 2-amino-3-phenyl-propanol, 2-amino-1-phenyl-1,3-propanediol and mixtures thereof.

The compounds which are preferably used are aliphatic compounds containing a primary or secondary amino group and at least one hydroxy group and mixtures of these compounds. Especially preferred are aliphatic compounds containing a secondary amino group and at least one hydroxy group, such as methylamino-ethanol, diethanolamine, 1,1'-iminodi-2-propanol and mixtures of these compounds.

Components a) and b) are used in amounts which correspond to a molar ratio of the carbonate groups and optionally ester groups of component a) to primary and secondary amino groups of component b) greater than 1:1 to 20:1, preferably 1.1:1 to 10:1 and more preferably 1.1:1 to 3:1.

The process according to the invention is generally conducted in the absence of solvent by mixing components a)

and b) with each other. The reaction is conducted at a temperature of 20 to 180° C., preferably 40 to 140° C.

In order to speed up the reaction of components a) and b) and/or to reduce the temperature of reaction, catalysts may optionally be used. Examples include triethylamine; tributylamine; 1,4-diazabicyclo-(2,2,2)-octane; N,N-dimethylbenzylamine; 2-methylimidazole; Mannich bases; tetraalkyl-ammonium hydroxides; alkali hydroxides such as lithium hydroxide or sodium hydroxide; alkali phenolates; alkali alcoholates such as methylates or ethylates of lithium, sodium or potassium; the catalysts described in EP-A 624, 614 which contain mixtures of alkali alcoholates and alkyl formates such as methyl formate or ethyl formate; tin compounds such as tin(II) octoate or dibutyltin oxide; and mixtures thereof.

The reaction is preferably conducted without a catalyst or with strongly basic catalysts such as alkali alcoholates.

When basic catalysts are used, they can optionally be neutralized after completion of the reaction with inorganic or organic acids, such as sulphuric acid, acetic acid, methanesulphonic acid and p-toluene sulphonic acid.

The progress of the reaction according to the invention can be determined by IR analysis (decrease of the amine bands at about 1590 cm$^{-1}$) or by the decrease in the amine number. The reaction is generally carried out until the amine number is less than 5.

The hydroxy-functional polyurethane carbonates obtained according to the invention are valuable binder components for polyurethane compositions, especially coating compositions, wherein they may optionally be used in combination with known cross-linkers such as polyisocyanate resins.

In the following examples are parts and percentages are by weight, unless otherwise indicated.

EXAMPLES

Starting materials polycarbonate 1: a homopolymeric polycarbonate based on 1,6-hexanediol having an OH content of 1.7% and a number average molecular weight of 2000 g/mole (Desmophen 2020, Bayer AG).
polycarbonate 2: an aliphatic polyester polycarbonate based on 1,6-hexanediol and ε-caprolactone having an OH content of 1.7% and a number average molecular weight of 2000 g/mole (Desmophen C 200, Bayer AG).

All viscosities set forth in the examples were measured in a rotating viscometer according to DIN 53 019 at 23° C. and at a shear rate of 28.9 s$^{-1}$.

Example 1

1000 g of dehydrated polycarbonate 1 were mixed with 188 g of methylamino-ethanol and heated to 120° C. with stirring. After 35 hours, the amine number had decreased to 4.

The product had an OH content of 8.8% and a viscosity of 176 mPa.s.

Example 2

500 g of dehydrated polycarbonate 1 were mixed with 131.4 g of diethanolamine and heated to 120° C. with stirring. After 20 hours, the amine number had decreased to 3.

The product had an OH content of 11.9% and a viscosity of 500 mPa.s.

Example 3

500 g of dehydrated polycarbonate 1 were mixed with 91.7 g of ethanolamine and heated to 120° C. with stirring. After 25 hours, the amine number had decreased to 4.

The product had an OH content of 10.0% and a viscosity of 1474 mPa.s.

Example 4

1400 g of dehydrated polycarbonate 1 were melted at 60° C. A mixture of 85.2 g of methylaminoethanol and 4.2 g of a 30% solution of sodium methylate in methanol was added over 30 minutes. After a further 60 minutes at 60° C., the amine number had decreased to 1.

The product solidified in wax-like form and had an OH content of 4.4%.

Example 5

2400 g of dehydrated polycarbonate 1 were melted at 60° C. A mixture of 368.5 g of methylaminoethanol and 7.2 g of a 30% solution of sodium methylate in methanol was added over 30 minutes. After a further 2 hours at 60° C., the amine number had decreased to 3. The product was neutralized with methanesulphonic acid.

The OH content was 7.6% and the viscosity was 797 mPa.s.

Example 6

1400 g of dehydrated polycarbonate 1 were melted at 60° C. A mixture of 433.4 g of methylaminoethanol and 4.2 g of a 30% solution of sodium methylate in methanol was added over 35 minutes. After a further 60 minutes at 60° C., the amine number had decreased to 3.

The product had an OH content was 12.0% and a viscosity of 157 mPa.s.

Example 7

1800 g of dehydrated polycarbonate 1 were melted at 60° C. A mixture of 220 g of methylaminoethanol, 307 g of diethanolamine and 14 g of a 30% solution of sodium methylate in methanol was added over 75 minutes. After a further 60 minutes at 60° C., the amine number had decreased to 2. The product was adjusted to a pH of 7 with sulphuric acid and filtered.

The OH content was 12.1% and the viscosity was 140 mPa.s.

Example 8

800 g of dehydrated polycarbonate 2 were heated at 60° C. A mixture of 44.6 g of methylaminoethanol and a 30% solution of sodium methylate in methanol was added over 35 minutes. After a further 2 hours at 60° C., the amine number had decreased to 1.

The product had an OH content was 4.3% and a viscosity of 1091 mPa.s.

Example 9

100 g of the product from Example 1 were treated and homogeneously mixed with 95 g of a solvent-free, aliphatic polyisocyanate based on hexamethylene diisocyanate (Desmodur N 3200, NCO content—23.0%, available from Bayer AG), and with 0.2 g of dibutyltin oxide. The mixture was applied to a test panel at a layer thickness of 5 mm. After 14 days at room temperature, a transparent coating was obtained, which was highly resistant to weathering and saponification and which had a Shore A hardness of 80.

Example 10

100 g of the product from Example 5 were treated and homogeneously mixed with 60 g of a solvent-free, aromatic polyisocyanate based on diphenylmethane diisocyanate (Desmodur VL, NCO content—31.5%, available from Bayer AG). The mixture was applied to a test panel at a layer thickness of 5 mm. After 3 days at room temperature, a transparent coating was obtained, which was highly resistant to weathering and saponification and had a Shore D hardness of 60.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for preparing a hydroxy-functional polyurethane carbonate having a molecular weight of up to about 450 which comprises reacting
   a) a dihydroxy- or higher hydroxy-functional polymer having a number average molecular weight of 500 to 100,000 and containing aliphatic carbonate groups and optionally ester groups with
   b) a compound containing at least one primary or secondary amino group and at least one hydroxy group, to form urethane groups, wherein components a) and b) are present in amounts which correspond to a molar ratio of carbonate and ester groups of component a) to primary and secondary amino groups of component b) of greater than 1:1 to 3:1.

2. A hydroxy-functional polyurethane carbonate having a molecular weight up to about 450 which is prepared by a process which comprises reacting
   a) a dihydroxy- or higher hydroxy-functional polymer having a number average molecular weight of 500 to 100,000 and containing aliphatic carbonate groups and optionally ester groups with
   b) a compound containing at least one primary or secondary amino group and at least one hydroxy group to form urethane groups, wherein components a) and b) are present in amounts which correspond to a molar ratio of carbonate and ester groups of component a) to primary and secondary amino groups of component b) of greater than 1:1 to 3:1.

3. A composition containing the hydroxy-functional polyurethane carbonate of claim 2 as a binder component.

4. A coating composition containing the hydroxy-functional polyurethane carbonate of claim 2 as a binder component.

5. A hydroxy-functional polyurethane carbonate which is prepared by a process which comprises reacting
   a) a dihydroxy- or higher hydroxy-functional polymer having a number average molecular weight of 500 to 100,000 and containing aliphatic carbonate groups and optionally ester groups with
   b) a compound containing at least one primary or secondary amino group and at least one hydroxy group to form urethane groups;

wherein the component b) comprises a component selected from the group consisting of 2-amino-1-propanol, 3-amino-1-propanol, 2-amino-1-butanol, 4-amino-1-butanol, 2-amino-2-methyl-1-propanol, 2-tert-butylaminoethanol, 2-amino-3-methyl-butanol, methylaminoethanol, 2-(ethylamino)-ethanol, 2-(2-aminoethoxy)-ethanol, 2-(2-aminoethylamino)-ethanol, 2-((3-amino-propyl)-methylamino)-ethanol, diethanol amine, 2-amino-2-methyl-1,3-propanediol, 3-(aminomethyl)-1,2-propanediol, 3-amino-1,2-propanediol, 1,1'-iminodi-2-propanol, 2-amino-2-hydroxymethyl-1,3-propanediol, 3-piperidinol, 4-piperidinol, 2,2,6,6-tetramethyl-4-piperidinol, 2-aminobenzyl alcohol, 3-aminobenzyl alcohol, 2-(benzylamino)-ethanol, 2-anilino-ethanol, 2-amino-3-phenyl-propanol, and 2-amino-1-phenyl-1,3-propanediol; and wherein components a) and b) are present in amounts which correspond to a molar ratio of carbonate and ester groups of component a) to primary and secondary amino groups of component b) of greater than 1:1 to 3:1.

6. A composition containing the hydroxy-functional polyurethane carbonate of claim 5 as a binder component.

7. A coating composition containing the hydroxy-functional polyurethane carbonate of claim 5 as a binder component.

8. A process for preparing a hydroxy-functional polyurethane carbonate which comprises reacting
   a) a dihydroxy- or higher hydroxy-functional polymer having a number average molecular weight of 500 to 100,000 and containing aliphatic carbonate groups and optionally ester groups with
   b) a compound containing at least one primary or secondary amino group and at least one hydroxy group, to form urethane groups, wherein the component b) comprises a component selected from the group consisting of 2-amino-1-propanol, 3-amino-1-propanol, 2-amino-1-butanol, 4-amino-1-butanol, 2-amino-2-methyl-1-propanol, 2-tert-butylaminoethanol, 2-amino-3-methyl-butanol, methylaminoethanol, 2-(ethylamino)-ethanol, 2-(2-aminoethoxy)-ethanol, 2-(2-aminoethylamino)-ethanol, 2-((3-amino-propyl)-methylamino)-ethanol, diethanol amine, 2-amino-2-methyl-1,3-propanediol, 3-(aminomethyl)-1,2-propanediol, 3-amino-1,2-propanediol, 1,1'-iminodi-2-propanol, 2-amino-2-hydroxymethyl-1,3-propanediol, 3-piperidinol, 4-piperidinol, 2,2,6,6-tetramethyl-4-piperidinol, 2-aminobenzyl alcohol, 3-aminobenzyl alcohol, 2-(benzylamino)-ethanol, 2-anilino-ethanol, 2-amino-3-phenyl-propanol, and 2-amino-1-phenyl-1,3-propanediol; and wherein components a) and b) are present in amounts which correspond to a molar ratio of carbonate and ester groups of component a) to primary and secondary amino groups of component b) of greater than 1:1 to 3:1.

9. The hydroxy-functional polyurethane carbonate of claim 5, wherein the carbonate has a molecular weight up to about 450.

10. The process of claim 8, wherein the carbonate has a molecular weight up to about 450.

* * * * *